(12) United States Patent
Zhao et al.

(10) Patent No.: US 10,051,623 B2
(45) Date of Patent: Aug. 14, 2018

(54) D2D COMMUNICATION METHOD AND DEVICE

(71) Applicant: China Academy of Telecommunications Technology, Beijing (CN)

(72) Inventors: Rui Zhao, Beijing (CN); Qiubin Gao, Beijing (CN); Wenhong Chen, Beijing (CN); Ying Peng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/111,915

(22) PCT Filed: Jan. 14, 2015

(86) PCT No.: PCT/CN2015/070679
§ 371 (c)(1),
(2) Date: Jul. 15, 2016

(87) PCT Pub. No.: WO2015/106684
PCT Pub. Date: Jul. 23, 2015

(65) Prior Publication Data
US 2016/0345313 A1 Nov. 24, 2016

(30) Foreign Application Priority Data
Jan. 16, 2014 (CN) .......................... 2014 1 0020046

(51) Int. Cl.
*H04W 72/04* (2009.01)
*H04W 74/02* (2009.01)
(Continued)

(52) U.S. Cl.
CPC ....... *H04W 72/0446* (2013.01); *H04W 72/02* (2013.01); *H04W 72/0406* (2013.01);
(Continued)

(58) Field of Classification Search
CPC ... H04W 74/002; H04W 74/02; H04W 74/08; H04W 74/16; H04W 84/18; H04W 72/02;
(Continued)

(56) References Cited

U.S. PATENT DOCUMENTS

| | | | |
|---|---|---|---|
| 2009/0036063 A1 | 2/2009 | Zuniga et al. | |
| 2013/0148566 A1* | 6/2013 | Doppler | H04W 72/005 370/312 |
| 2014/0094183 A1* | 4/2014 | Gao | H04W 72/048 455/450 |

FOREIGN PATENT DOCUMENTS

| | | |
|---|---|---|
| CN | 101548570 A | 9/2009 |
| CN | 103209487 | 7/2013 |

(Continued)

OTHER PUBLICATIONS

International Search Report for PCT/CN2015/070679 dated Apr. 21, 2015.
(Continued)

*Primary Examiner* — Jianye Wu
(74) *Attorney, Agent, or Firm* — Foley & Lardner LLP (57) ABSTRACT

Disclosed are a D2D communication method and device. The method comprises: transmitting, by a transmitting-end device, a control message in a control region of a current communication frame, the control message at least comprising resource indication information, and monitoring control messages, at least comprising the resource indication information, of other transmitting-end devices in the control region of the current communication frame, the resource indication information being used for indicating a data channel in a data region of the current communication frame occupied by the transmitting-end device; and according to the monitored resource indication information, transmitting D2D data on the data channel occupied thereby. In the technical solution provided in the embodiments of the
(Continued)

present invention, the communication frame for D2D communications comprises a control region and a data region, wherein the data region further comprises a plurality of data channels. By way of mutually monitoring a control message of a control region by different transmitting-end devices, the resource conflict caused by competition can be avoided.

20 Claims, 6 Drawing Sheets

(51) Int. Cl.

| | | |
|---|---|---|
| *H04W 72/02* | (2009.01) | |
| *H04W 72/08* | (2009.01) | |
| *H04W 72/10* | (2009.01) | |
| *H04W 74/00* | (2009.01) | |
| *H04W 74/08* | (2009.01) | |
| *H04W 84/18* | (2009.01) | |
| *H04W 88/04* | (2009.01) | |

(52) U.S. Cl.
CPC ......... *H04W 72/085* (2013.01); *H04W 72/10* (2013.01); *H04W 74/02* (2013.01); *H04W 74/002* (2013.01); *H04W 74/0816* (2013.01); *H04W 84/18* (2013.01); *H04W 88/04* (2013.01)

(58) Field of Classification Search
CPC ......... H04W 72/0406; H04W 72/0446; H04W 72/085; H04W 72/10; H04W 88/04
See application file for complete search history.

(56) References Cited

FOREIGN PATENT DOCUMENTS

| CN | 103843444 A | 6/2014 |
|---|---|---|
| JP | 2006-303735 A | 11/2006 |
| JP | 2010-512113 A | 4/2010 |
| JP | 2010-533435 A | 10/2010 |
| WO | WO-2012-159270 | 11/2012 |

OTHER PUBLICATIONS

Jin-Woo Kim, et al., "A Distributed Reservation Protocol for Collision-Free Three-Hop Mobility Support in WiMedia MAC," 2009 International Conference on Computational Science and Engineering, 2009 IEEE.

Seyoun Lim, et al., "A Self-Scheduling Multi-Channel Cognitive Radio MAC Protocol Based on Cooperative Communications," IEICE Trans. Commun., vol. E94-B, No. 6, Jun. 2011.

Catt, "Resource allocation mechanism in mode 2," 3GPP TSG RAN WG1 Meeting #76bis, Shenzhen, China Mar. 31-Apr. 4, 2014 (R1-141194).

Mahesh K. Marina et al., "RBRP: A Robust Broadcast Reservation Protocol for Mobile Ad Hoc Networks," 2001 IEEE.

3GPP TSG-RAN1 Meeting #75 R1-135278 "Physical channel design for D2D communications" San Francisco, US, Nov. 11-15, 2013. (pp. 5).

* cited by examiner

D2D COMMUNICATION METHOD AND DEVICE

This application is a U.S. National Stage of International Application No. PCT/CN2015/070679, filed on Jan. 14, 2015, designating the United States and claiming priority to Chinese Patent Application No. 201410020046.X, filed with the Chinese Patent Office on Jan. 16, 2014and entitled "D2D communication method and device", which is hereby incorporated by reference in its entirety.

FIELD

The present invention relates to the field of wireless communications, and particularly to a D2D communication method and device.

BACKGROUND

Device to Device (D2D) communication, i.e., direct communication between devices, refers to a communication mode in which adjacent User Equipments (UEs) can transmit data on a direct link in a short-distance range without the data being forwarded by a central node (i.e., a base station).

Figure 1A:
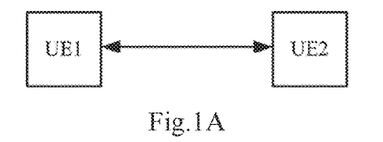
FIG. 1A to FIG. 1D are schematic diagrams of D2D communication scenarios.
Figure 1B:
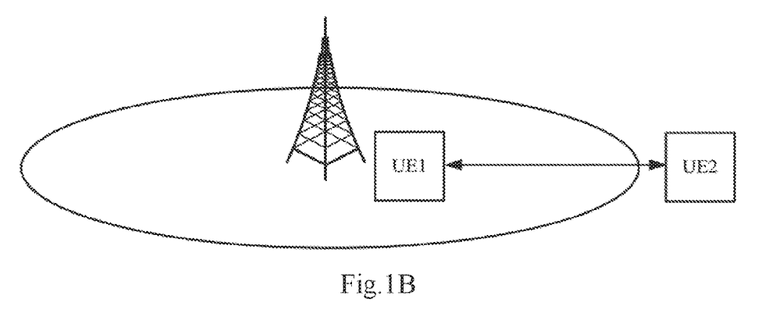
Figure 1C:
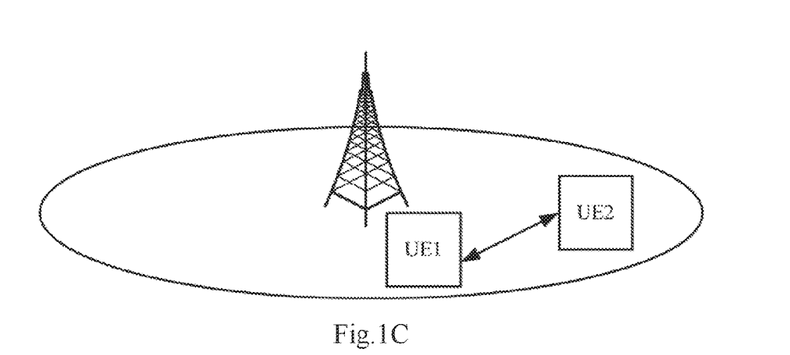
Figure 1D:
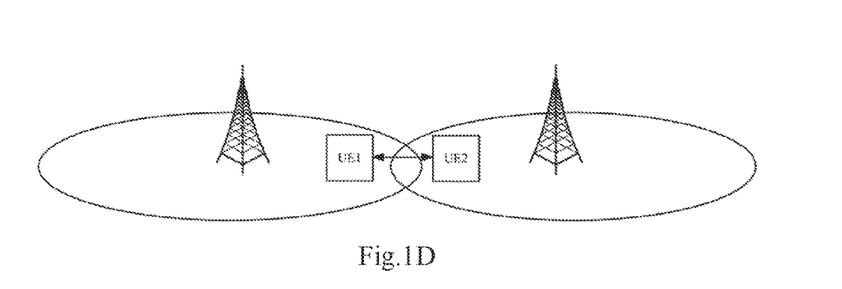

There are generally the following scenarios in the studies on D2D communication, where more than one of the scenarios can occur concurrently:

An out of coverage scenario as illustrated in FIG. 1A where both a UE 1 and a UE 2 reside outside a coverage area;

A partial coverage scenario as illustrated in FIG. 1B where the UE 1 resides in the coverage area of a cell (in coverage), and the UE 2 resides outside the coverage area of the cell;

An in coverage-single-cell scenario as illustrated in FIG. 1C where the UE 1 and the UE 2 reside in the coverage area of the same cell; and An in coverage-multi-cell scenario as illustrated in FIG. 1D where the UE 1 and the UE 2 reside in the coverage areas of different cells.

Particularly if the UE 1 is a transmitting UE transmitting information, then the UE 2 receives the information transmitted by the UE 1. Alternatively the UE 2 can be a transmitting UE transmitting information, and the UE 1 can receive the information transmitted by the UE 2.

In D2D communication, in addition to the one-to-one communication mode between D2D UEs, there is another application scenario where group/broadcast communication is conducted between the D2D UEs, which can be applicable to fire fighting, rescue, antiterrorism, etc., among public security applications.

The Long Term Evolution (LTE) D2D technology refers to D2D discovery and communication procedures, controlled by an LTE network, operating in an LTE licensed frequency band. On one hand, the advantages of the D2D technology can be fully utilized, and on the other hand, some problems of the traditional D2D technology, e.g., uncontrollable interference, etc., can be overcome due to the control by the LTE network. The introduction of the LTE D2D characteristics enables the LTE technology to evolve from the simple radio mobile cellular communication technology toward the universal connectivity technology.

In LTE D2D transmission, in a contention-based resource allocation method, the respective D2D UEs compete for resources for D2D transmission under the same rule. This method is generally applicable to such a scenario that there is no central scheduling node, e.g., the out of coverage scenario above, where the respective D2D UEs compete randomly for transmission resources without centralized scheduling, thus resulting in resource collision.

SUMMARY

An object of the invention is to provide a D2D communication method and device so as to address the problem of resource collision occurring between D2D UEs competing for resources.

The object of the invention is attained by the following technical solutions:

A D2D communication method includes:

transmitting, by a transmitting UE, a control message in a control region of a current communication frame, and monitoring control messages of other transmitting UEs in the control region of the current communication frame, wherein the control message includes at least resource indication information indicating a data channel, occupied by the transmitting UE in a data region of the current communication frame.

With the technical solution according to the embodiment of the invention, the communication frame of D2D communication includes the control region and the data region, where the data region further includes a number of data channels. The different transmitting UEs can monitor the control messages of each other in the control region to thereby avoid resource collision arising from competition.

Preferably before the control message is transmitted in the control region of the current communication frame, the transmitting UE can further detect a set of idle data channels in the data region of the current communication frame, and select the data channel in the detected set of idle data channels, wherein the control message transmitted by the transmitting UE includes at least the resource indication information indicating that the selected data channel is occupied.

Furthermore detecting, by the transmitting UE, the set of idle data channels in the data region of the current communication frame may include: determining, by the transmitting UE, the set of idle data channels in the data region of the current communication frame by detecting energy; and/or determining, by the transmitting UE, the set of idle data channels in the data region of the current communication frame according to the resource indication information transmitted by the other transmitting UEs.

Preferably the method further includes:

transmitting, by the transmitting UE, D2D data over the data channel occupied by the transmitting UE according to the monitored resource indication information.

Further to any one of the embodiments above of the method, preferably transmitting, by the transmitting UE, the D2D data over the data channel occupied by the transmitting UE according to the monitored resource indication information may include: determining, by the transmitting UE, that there is no resource collision over the data channel occupied by the transmitting UE, according to the monitored resource indication information, and transmitting the D2D data over the data channel.

If the transmitting UE determines that there is resource collision over the data channel occupied by the transmitting UE, according to the monitored resource indication information, then the transmitting UE may select the data channel in the detected set of idle data channels, and transmit in a control region of a next communication frame a control message including resource indication information that the currently selected data channel is occupied; or the transmitting UE may determine randomly the number N of communication frames to be fallback, and transmit the control message in a control region of the (N+1)-th communication frame following the current communication frame.

Further to any one of the embodiments above of the method, preferably transmitting, by the transmitting UE, the control message in the control region of the current communication frame may include: transmitting, by the transmitting UE, the control message over a control channel, corresponding to the data channel occupied by the transmitting UE, in the control region of the current communication frame; or transmitting, by the transmitting UE, the control message over a randomly selected control channel in the control region of the current communication frame.

Further to any one of the embodiments above of the method, preferably transmitting, by the transmitting UE, the control message in the control region of the current communication frame, and monitoring the control messages of other transmitting UEs in the control region of the current communication frame may include: determining, by the transmitting UE, its silent period in the control region of the current communication frame, transmitting the control message in non-silent period in the control region of the current communication frame, and monitoring the control messages of the other transmitting UEs in the silent period in the control region of the current communication frame.

Further to any one of the embodiments above of the method, preferably transmitting, by the transmitting UE, the control message in the control region of the current communication frame may include: determining, by the transmitting UE, a contention region in the control region of the current communication frame according to its own priority, and transmitting the control message in the contention region, wherein the transmitting UE with a higher priority has a larger contention region.

Further to any one of the embodiments above of the method, preferably the control message further includes priority information of the transmitting UE, and transmitting, by the transmitting UE, the D2D data over the data channel occupied by the transmitting UE according to the monitored resource indication information may include: if the transmitting UE determines that there is resource collision over the data channel occupied by the transmitting UE, according to the monitored resource indication information, then comparing a monitored priority with its own priority, and if its own priority s higher than the monitored priority, then transmitting the D2D data over the data channel.

Further to any one of the embodiments above of the method, preferably the transmitting UE transmits the D2D data over the data channel occupied by the transmitting UE until the D2D service is terminated or the transmitting UE transmits resource release instruction information.

Further to this, before the D2D service is terminated, the transmitting UE may transmit placeholder indication information over the data channel occupied by the transmitting UE in a silent period of the D2D service.

Further to any one of the embodiments above of the method, preferably the communication frame is determined by the transmitting UE from a pool of time-frequency resources of D2D communication after a super-frame is synchronized.

Preferably the communication frame is determined by: determining the communication frame from the pool of time-frequency resources of D2D communication in a predefined manner; or obtaining configuration information of the pool of time-frequency resources from detected synchronization information, and determining the communication frame according to the configuration information of the pool of time-frequency resources.

A D2D communication method includes:
monitoring, by a receiving UE, a control message of a transmitting UE in a control region of a current communication frame, wherein the control message carries at least resource indication information indicating a data channel, occupied by the transmitting UE, in a data region of the current communication frame; and receiving, by the receiving UE. D2D data in the data region of the current communication frame according to the monitored resource indication information.

With the technical solution according to the embodiment of the invention, the communication frame of D2D communication includes the control region and the data region, where the data region further includes a number of data channels. Different transmitting UEs can monitor control messages of each other in the control region to thereby avoid resource collision arising from competition.

Preferably the communication frame is determined by the receiving UE in a pool of time-frequency resources of D2D communication after a super-frame is synchronized.

Preferably the communication frame is determined by:
determining the communication frame from the pool of time-frequency resources of D2D communication in a predefined manner; or determining configuration information of the pool of time-frequency resources of D2D communication from monitored synchronization information, and determining the communication frame according to the configuration information of the pool of time-frequency resources of D2D communication.

Based upon the same inventive idea as the method, an embodiment of the invention further provides a transmitting UE including:

a resource contention module configured to transmit a control message in a control region of a current communication frame, and to monitor control messages, including at least resource indication information, of other transmitting UEs in the control region of the current communication frame, wherein the control message includes at least resource indication information, the resource indication information indicating a data channel occupied by the transmitting UE in a data region of the current communication frame; and a D2D communication module configured to transmit D2D data over the data channel occupied by the transmitting UE according to the monitored resource indication information.

With the technical solution according to the embodiment of the invention, the communication frame of D2D communication includes the control region and the data region, where the data region further includes a number of data channels. The different transmitting UEs can monitor control messages of each other in the control region to thereby avoid resource collision arising from competition.

Preferably before the control message is transmitted in the control region of the current communication frame, the resource contention module is further configured:

to detect a set of idle data channels in the data region of the current communication frame, and to select the data channel in the detected set of idle data channels, wherein the control message transmitted by the resource contention module includes at least the resource indication information indicating that the selected data channel is occupied.

Furthermore the resource contention module configured to detect the set of idle data channels in the data region of the current communication frame is configured:

to determine the set of idle data channels in the data region of the current communication frame by detecting energy: and/or to determine the set of idle data channels in the data region of the current communication frame according to the resource indication information transmitted by the other transmitting UEs.

Preferably the D2D communication module is configured:

to determine that there is no resource collision over the data channel occupied by the transmitting UE, according to the monitored resource indication information, and to transmit the D2D data over the data channel.

Preferably if it is determined that there is resource collision over the data channel occupied by the transmitting UE, according to the monitored resource indication information, then the D2D communication module is further configured:

to select the data channel in the detected set of idle data channels, and to transmit in a control region of a next communication frame a control message including resource indication information that the currently selected data channel is occupied: or to determine randomly the number N of communication frames to be fallback, and to transmit the control message in a control region of the (N+1)-th communication frame following the current communication frame.

Further to any one of the embodiments above of the transmitting UE, preferably the resource contention module configured to transmit the control message in the control region of the current communication frame is configured:

to transmit the control message over a control channel, corresponding to the data channel occupied by the transmitting UE, in the control region of the current communication frame: or to transmit the control message over a randomly selected control channel in the control region of the current communication frame.

Further to any one of the embodiments above of the transmitting UE, preferably the resource contention module is configured:

to determine its silent period in the control region of the current communication frame, to transmit the control message in non-silent period in the control region of the current communication frame, and to monitor the control messages of the other transmitting UEs in the silent period in the control region of the current communication frame.

Further to any one of the embodiments above of the transmitting UE, preferably the resource contention module configured to transmit the control message in the control region of the current communication frame is configured:

to determine a contention region in the control region of the current communication frame according to its own priority, and to transmit the control message in the contention region, wherein the transmitting UE with a higher priority has a larger contention region.

Further to any one of the embodiments above of the transmitting UE, preferably the control message further includes priority information of the transmitting UE, and the D2D communication module is configured:

if the transmitting UE determines that there is resource collision over the data channel occupied by the transmitting UE, according to the monitored resource indication information, to compare a monitored priority with its own priority, and if its own priority is higher than the monitored priority, to transmit the D2D data over the data channel.

Further to any one of the embodiments above of the transmitting UE, preferably the D2D communication module is configured to transmit the D2D data over the data channel occupied by the transmitting UE until the D2D service is terminated or the transmitting UE transmits resource release instruction information.

Preferably before the D2D service is terminated, the D2D communication module is further configured:

to transmit placeholder indication information over the data channel occupied by the transmitting UE in a silent period of the D2D service.

Further to any one of the embodiments above of the transmitting UE, preferably the communication frame is determined by the transmitting UE from a pool of time-frequency resources of D2D communication after a superframe is synchronized Preferably the communication frame is determined by:

determining the communication frame from the pool of time-frequency resources of D2D communication in a predefined manner; or obtaining configuration information of the pool of time-frequency resources from detected synchronization information, and determining the communication frame according to the configuration information of the pool of time-frequency resources.

Based upon the same inventive idea as the method, an embodiment of the invention further provides a D2D UE including a processor and a radio frequency unit, wherein:

the processor is configured to transmit a control message in a control region of a current communication frame through the radio frequency unit, and to monitor control messages, including at least resource indication information, of other transmitting UEs in the control region of the current communication frame through the radio frequency unit, wherein the control message includes at least resource indication information indicating a data channel, occupied by the transmitting UE in a data region of the current communication frame; and to transmit D2D data over the data channel occupied by the D2D UE through the radio frequency unit according to the monitored resource indication information.

With the technical solution according to the embodiment of the invention, the communication frame of D2D communication includes the control region and the data region, where the data region further includes a number of data channels. Different D2D UEs can monitor control messages of each other in the control region to thereby avoid resource collision arising from competition.

Based upon the same inventive idea as the method, an embodiment of the invention further provides a receiving UE including:

a control message monitoring module configured to monitor a control message of a transmitting UE in a control region of a current communication frame, wherein the control message carries at least resource indication information indicating a data channel, occupied by the transmitting UE, in a data region of the current communication frame; and a D2D communication module configured to receive D2D data in the data region of the current communication frame according to the monitored resource indication information.

With the technical solution according to the embodiment of the invention, the communication frame of D2D communication includes the control region and the data region, where the data region further includes a number of data channels. Different transmitting UEs can monitor control messages of each other in the control region to thereby avoid resource collision arising from competition.

Preferably the communication frame is determined by the receiving UE from a pool of time-frequency resources of D2D communication after a super-frame is synchronized.

Preferably the communication frame is determined by:
determining the communication frame from the pool of time-frequency resources of D2D communication in a predefined manner; or
obtaining configuration information of the pool of time-frequency resources of D2D communication from detected synchronization information, and determining the communication frame according to the configuration information of the pool of time-frequency resources of D2D communication.

Based upon the same inventive idea as the method, an embodiment of the invention further provides a receiving UE including a processor and a radio frequency unit, wherein:

the processor is configured to monitor a control message of a transmitting UE in a control region of a current communication frame through the radio frequency unit, where the control message carries at least resource indication information indicating a data channel, occupied by the transmitting UE, in a data region of the current communication frame; and to receive D2D data in the data region of the current communication frame through the radio frequency unit according to the monitored resource indication information.

With the technical solution according to the embodiment of the invention, the communication frame of D2D communication includes the control region and the data region, where the data region further includes a number of data channels. Different transmitting UEs can monitor control messages of each other in the control region to thereby avoid resource collision arising from competition.

BRIEF DESCRIPTION OF THE DRAWINGS

FIG. 14 is a schematic diagram of a transmitting UE according to an embodiment of the invention; and.

DETAILED DESCRIPTION OF THE EMBODIMENTS

The technical solutions according to the embodiments of the invention will be described below in details with reference to the drawings.

In the embodiments of the invention, a communication frame structure of D2D communication includes a control region and a data region.

The control region can be divided into a number of control channels, and the data region can be divided into a number of data channels. Correspondingly, different transmitting UEs (i.e., TX UEs) transmit control messages respectively over the different control channels.

Figure 2:
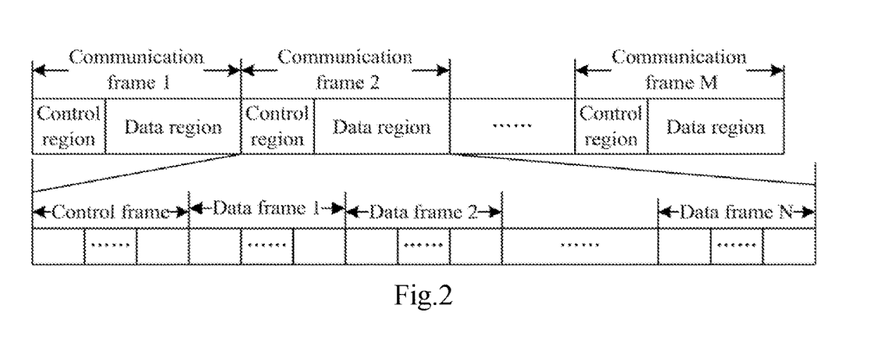
FIG. 2 is a schematic diagram of a first communication frame structure according to an embodiment of the invention.
Figure 3:
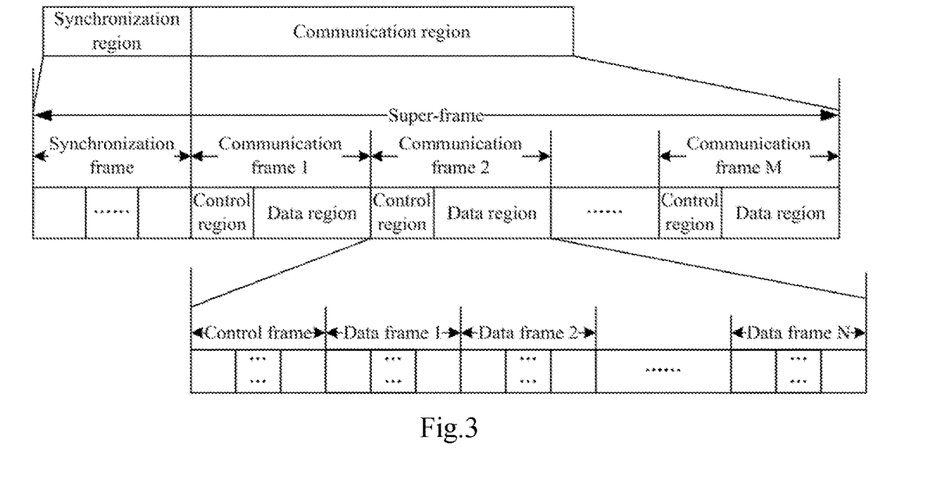
FIG. 3 is a schematic diagram of a second communication frame structure according to an embodiment of the invention.

Taking a communication frame illustrated in FIG. 2 as an example, the communication frame is divided into a control region and a data region in the time domain, where the data region is further divided into a number of data frames in the time domain. In order to synchronize a super-frame, a super-frame structure of D2D communication is as illustrated in FIG. 3 where the super-frame is divided into a synchronization region and a communication region in the time domain, where the synchronization region includes a synchronization frame, and the communication region includes M communication frames.

In an embodiment of the invention, a control message carries at least resource indication information, the resource indication information indicating a data channel, occupied by a transmitting UE (TX UE), in the data region of the current communication frame, and particularly indicating a time-frequency resource position of the data channel. Optionally the control message further carries a priority, modulation and coding indication information, a transmission state for determining the control region, a transmission state for determining the data region, initialization identification information which is a DMRS sequence, identification information of initialization identification information which is a scrambling sequence, etc., of the communication device.

Particularly the control region lasts for at least 1 millisecond in the time domain.

Particularly a data frame lasts for at least 1 millisecond in the time domain.

Figure 4:
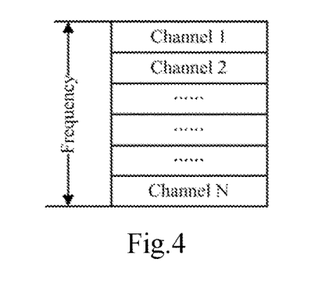
FIG. 4 is a schematic diagram of a channel frequency division multiplex access mode according to an embodiment of the invention.
Figure 5:
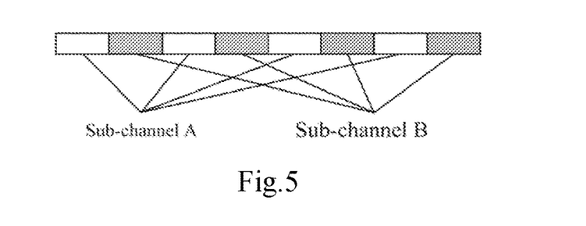
FIG. 5 is a schematic diagram of a channel time division multiplex access mode according to an embodiment of the invention.

In an embodiment of the invention, in order to achieve a better coverage effect and taking into account the characteristics of VoIP and other services, at least a Frequency Division Multiplex Access (FDMA) mode needs to be supported for the control channels. As illustrated in FIG. 4, a bandwidth where the D2D system operates can be divided into a number of control channels with equal bandwidth. Optionally, sub-channels in a Time Division Multiplex Access (TDMA) mode can be further defined in addition to the FDMA mode as illustrated in FIG. 5.

At least the FDMA mode needs to be supported for the data channels, and as illustrated in FIG. 4, the bandwidth where the D2D system operates can be divided into a number of data channels with equal bandwidth. Optionally, sub-channels in the TDMA mode can be further defined in addition to the FDMA mode as illustrated in FIG. 5.

In an embodiment of the invention, the control channels and the data channels can be associated, or can be independent of each other.

Figure 6:
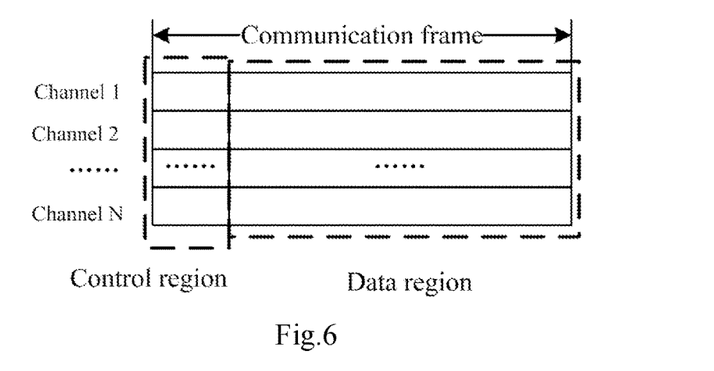
FIG. 6 is a schematic diagram of the presence of a correspondence relationship between a control channel and a data channel according to an embodiment of the invention.
Figure 7:
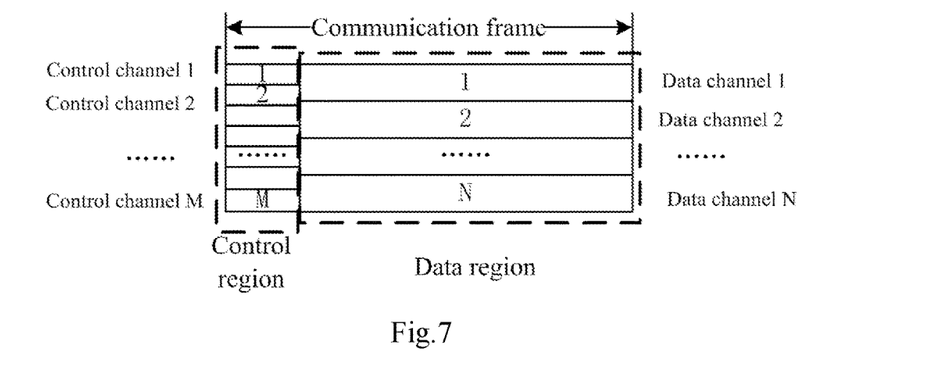
FIG. 7 is a schematic diagram of the absence of a correspondence relationship between a control channel and a data channel according to an embodiment of the invention.

That is, there may be a fixed one-to-one correspondence relationship between the control channels and the data channels. Optionally the same frequency resource is occupied for a control channel and a data channel corresponding thereto, and if channel division in the time domain is further defined, then accordingly there will also be a fixed correspondence relationship in the time domain, particularly as illustrated in FIG. 6. Alternatively there may be no fixed one-to-one correspondence relationship between the control channels and the data channels, particularly as illustrated in FIG. 7.

Particularly if there is a fixed one-to-one correspondence relationship between the control channels and the data channels, then the resource indication information transmitted by a transmitting UE can be the time-frequency resource position of the data channel, or can be indication information indicating that the data channel is occupied. For example, if the transmitting UE only needs to occupy the channel 1 of the data region illustrated in FIG. 6, then the transmitting UE can transmit the control message over the channel 1 of the control region, where the time-frequency position in which the control message is transmitted implicitly indicates the resource indication information indicating that the data channel is occupied. Correspondingly a UE receiving the control message can know that the transmitting UE occupies the channel 1 of the data region, according to the correspondence relationship between the control channels and the data channels.

Figure 8:
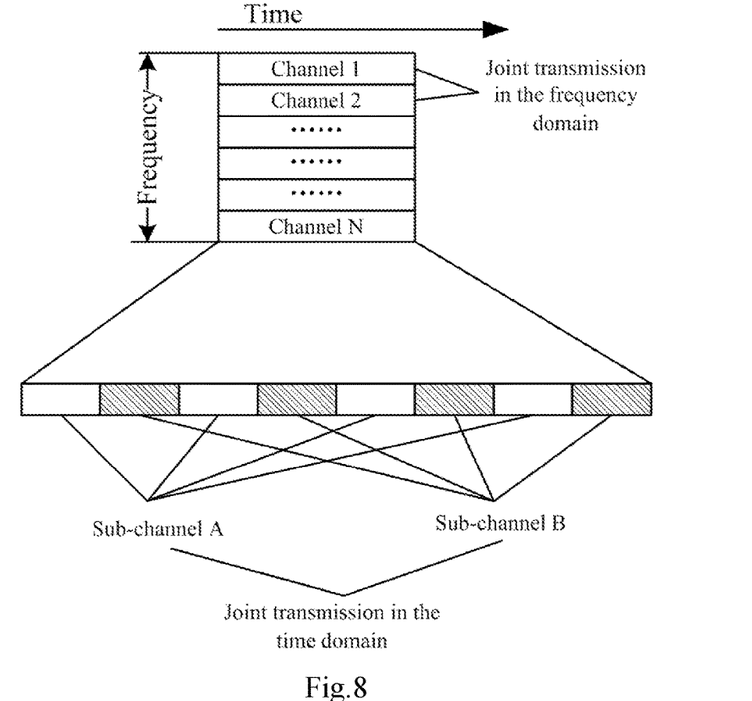
FIG. 8 is a schematic diagram of joint transmission according to an embodiment of the invention.

Furthermore in order to support a variety of services flexibly, for example, an FTP service needs a higher bandwidth, and can be carried jointly over a number of data channels, and a VoIP service can be carried over only one data channel. The data channels shall support the mode in which a service is carried jointly over a number of data channels, and also taking into account the single-carrier characteristic of D2D transmission, joint data channels thereof shall be data channels adjacent in frequency domain. Correspondingly in the resource indication information carried in the control channels, the information indicating the resources shall be defined similarly to the allocation type 2 of LTE downlink resources, where the resources are indicated at the granularity of a data channel. For example, if the operating bandwidth of the D2D system is 10 MHz (50 PRBs), and the bandwidth of a data channel is 2 PRBs, then the bandwidth can be divided into 25 data channels accordingly in frequency domain. Reference can be made to 3GPP TS 36.213 for details thereof. Furthermore if sub-channels in time domain are defined, then joint operations in time domain can be further included, particularly as illustrated in FIG. 8.

Figure 9:
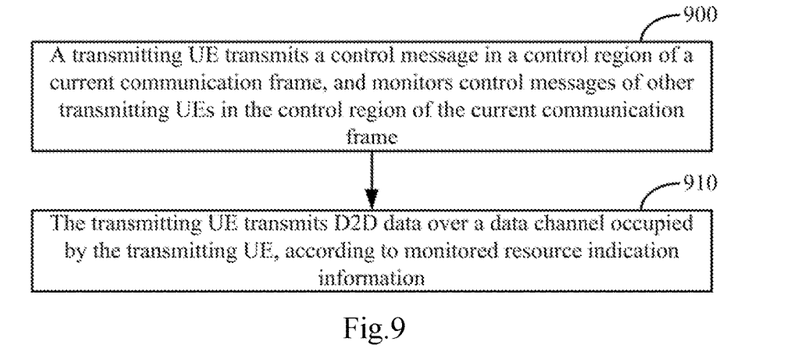
FIG. 9 is a D2D communication flow chart according to an embodiment of the invention.

Further to the definition above of the communication frame in the D2D system, FIG. 9 illustrates a D2D communication method at the transmitting UE side according to an embodiment of the invention, which particularly includes the following operations:

Step 900, a transmitting UE transmits a control message in a control region of a current communication frame, and monitors control messages of other transmitting UEs in the control region of the current communication frame.

Specifically, the different transmitting UEs transmit the control messages over different control channels.

Step 910, the transmitting UE transmits D2D data over a data channel occupied by the transmitting UE, according to the resource indication information monitored.

The transmitting UE is a D2D UE (TX UE) transmitting data.

With the technical solution according to the embodiment of the invention, the communication frame of D2D communication includes the control region and a data region, where the data region further includes a number of data channels. The different transmitting UEs can monitor the control messages of each other in the control region to thereby avoid resource collision arising from competition. Furthermore with the technical solution according to the embodiment of the invention, power consumption and processing complexity of the transmitting UEs can be lowered in effect.

Preferably before the control message is transmitted in the control region of the current communication frame, the transmitting UE can further detect a set of idle data channels in the data region of the current communication frame, and select the data channel in the detected set of idle data channels. The resource indication information included in the control message transmitted by the transmitting UE indicates that the selected data channel is occupied.

Furthermore the transmitting UE can detect the set of idle data channels in the data region of the current communication frame as follows: the transmitting UE determines the set of idle data channels in the data region of the current communication frame by detecting energy; and/or the transmitting UE determines the set of idle data channels in the data region of the current communication frame according to the resource indication information transmitted by the other transmitting UEs.

The transmitting UE determining the set of idle data channels in the data region of the current communication frame according to the resource indication information transmitted by the other transmitting UEs particularly refers to: the transmitting UE determining data channels occupied by the other transmitting UEs in the data region of the current communication frame, according to the resource indication information transmitted by the other transmitting UEs, and further determining the set of idle data channels including the other data channels than the data channels occupied by the other transmitting UEs.

Further to any one of the embodiments above of the method, preferably the step 910 can be performed particularly as follows: the transmitting UE determines that there is no resource collision over the data channel occupied by the transmitting UE, according to the monitored resource indication information, and transmits the D2D data over the data channel occupied by the transmitting UE.

If the transmitting UE determines there is resource collision over the data channel occupied by the transmitting UE, according to the monitored resource indication information, then the collision can be resolved in a number of approaches, several of which will be listed below:

First Collision Resolution Approach:

The transmitting UE can select the data channel in the detected set of idle data channels, and transmit in a control region of a next communication frame a control message including resource indication information that the data channel is occupied.

Particularly the data channel can be selected in the detected set of idle data channels randomly or in a predefined manner.

A different idle data channel can be selected in the next communication frame to thereby avoid the collision.

Second Collision Resolution Approach:

The transmitting UE can determine randomly the number N of communication frames to be fallback, and transmit the control message in a control region of the (N+1)-th communication frame following the current communication frame.

Since the transmitting UE needs to monitor the control messages in the control region of the communication frame, and to update the information about its set of idle data channels, the information about its set of idle data channels is updated as the different communication frames are fallback, thus avoiding the resource collision.

In the first collision resolution approach, if there is still resource collision over the data channel selected in the next communication frame, the collision can be resolved using the second collision resolution approach, where if there are a smaller number of channel resources in the set of idle data channels, then a larger number of communication frames will be fallback.

Third Collision Resolution Approach:

The data are transmitted directly in the data region in a CSMA mode.

Fourth Collision Resolution Approach:

The control message further includes the priority of the transmitting UE, and the transmitting UE compares a monitored priority with its own priority, and if its own priority is higher than the monitored priority, then the transmitting UE transmits the D2D data over the data channel occupied by the transmitting UE.

Further to any one of the embodiments above of the method, if the control channels are associated with the data channels, then the transmitting UE can transmit the control message in the control region of the current communication frame particularly as follows: the transmitting UE transmits the control message over the control channel, corresponding to the data channel occupied by the transmitting UE, in the control region of the current communication frame. If the control channels are not associated with the data channels, then the transmitting UE transmits the control message over a randomly selected control channel in the control region of the current communication frame.

Further to any one of the embodiments above of the method, preferably the transmitting UE can transmit the control message in the control region of the current communication frame, and monitor the control messages of the other transmitting UEs in the control region of the current communication frame as follows: the transmitting UE determines its silent period in the control region of the current communication frame, transmits the control message in non-silent period in the control region of the current communication frame, and monitors the control messages of the other transmitting UEs in the silent period in the control region of the current communication frame.

Figure 10:
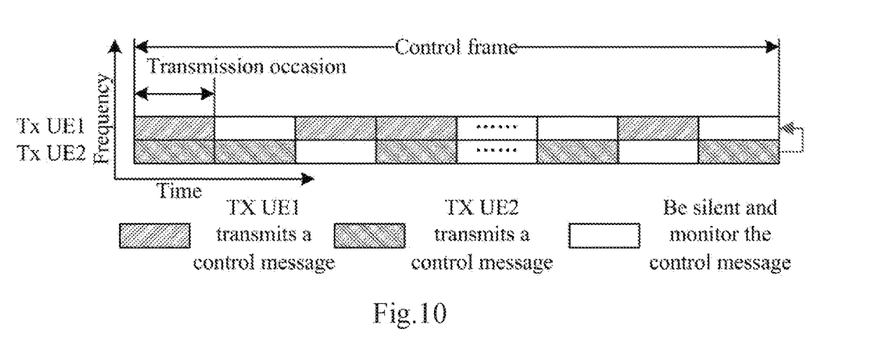
FIG. 10 is a schematic diagram of a silent period according to an embodiment of the invention.

Particularly the silent period can be determined in a number of manners. For example, the control region can be divided into a number of transmission occasions in the time domain, where a transmission occasion can be 1 millisecond, or can be a timeslot. The transmitting UE can determine randomly those transmission occasions which are silent in the control region of the current communication frame. Alternatively the transmitting UE can determine in a predefined manner those transmission occasions which are silent in the control region of the current communication frame. For example, for each transmission occasion, the transmitting UE generates a random number as a function of identification information of each transmission occasion, and determines from the random number whether the transmission occasion is silent. As illustrated in FIG. 10, the TX UE 1 transmits the control messages on the first, third, fourth, and last second transmission occasions of the control region, and monitors the control messages on the other transmission occasions; and the TX UE 2 transmits the control message on the first, second, fourth, and last transmission occasions of the control region, and monitors the control messages on the other transmission occasions.

Figure 11:
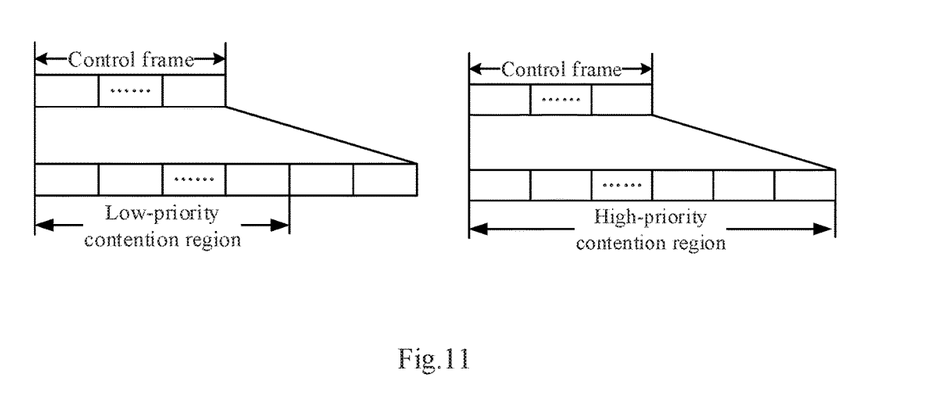
FIG. 11 is a schematic diagram of a contention region according to an embodiment of the invention.

Further to any one of the embodiments above of the method, preferably the transmitting UE can transmit the control message in the control region of the current communication frame particularly as follow: the transmitting UE determine a contention region in the control region of the current communication frame according to its own priority, and transmits the control message in the contention region. As illustrated in FIG. 11, if there is a higher priority of the transmitting UE, then its contention region is larger. It shall be noted that the contention region can be consecutive in the time domain as illustrated in FIG. 1, or can be inconsecutive in the time domain.

Particularly if there are transmitting UEs with the same priority, then they have the same contention region, and transmit and monitor control messages of each other throughout the control region in the respective approaches according to the respective embodiments above. If there are transmitting UEs with different priorities, then the transmitting UE with the lower priority may be silent, and monitor a control message transmitted by the transmitting UE with the higher priority, in another region than the contention region of the control region.

Further to any one of the embodiments above of the method, preferably the transmitting UE transmits the D2D data over the data channel occupied by the transmitting UE until the D2D service is terminated or the transmitting UE transmits resource release instruction information.

Further to this, the transmitting UE transmit placeholder indication information over the data channel occupied by the transmitting UE in a silent period of the D2D service before the D2D service is terminated.

Further to any one of the embodiments above of the method, preferably the communication frame is determined by the transmitting UE in a pool of time-frequency resources of D2D communication after a super-frame is synchronized. Preferably the communication frame is determined by determining the communication frame in the pool of time-frequency resources of D2D communication in a predefined manner: or by detecting configuration information of the pool of time-frequency resources from detected synchronization information, and determining the communication frame according to the configuration information of the pool of time-frequency resources.

Figure 12:
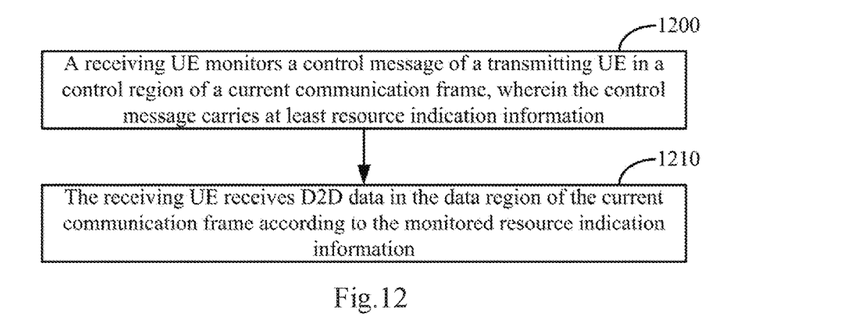
FIG. 12 is another D2D communication flow chart according to an embodiment of the invention.

Further to the definition above of the communication frame in the D2D system, FIG. 12 illustrates a D2D communication method at the receiving UE side according to an embodiment of the invention, which particularly includes the following operations:

Step 1200, a receiving UE monitors a control message of a transmitting UE in a control region of a current communication frame, where the control message carries at least resource indication information indicating a data channel, occupied by the transmitting UE, in a data region of the current communication frame.

Step 1210, the receiving UE receives D2D data in the data region of the current communication frame according to the monitored resource indication information.

In an embodiment of the invention, the receiving UE is a UE receiving D2D data (RX UE).

With the technical solution according to the embodiment of the invention, the communication frame of D2D communication includes the control region and the data region, where the data region further includes a number of data channels so that different transmitting UE can monitor control message of each other in the control region to thereby avoid resource collision arising from competition.

A repeated description of the same aspects of the respective embodiments of the communication method at the receiving UE as the embodiments of the communication method at the transmitting UE will be omitted here.

Preferably the communication frame is determined by the receiving UE in a pool of time-frequency resources of D2D communication after a super-frame is synchronized.

Preferably the communication frame is determined by:

Determining the communication frame from the pool of time-frequency resources of D2D communication in a predefined manner; or Determining configuration information of the pool of time-frequency resources of D2D communication from detected synchronization information, and determining the communication frame according to the configuration information of the pool of time-frequency resources of D2D communication.

The methods according to the embodiments of the invention will be described below by way of an example where a TX UE and a RX UE cooperate.

Firstly a super-frame is synchronized by the D2D UEs (the TX UE and the RX UE) in D2D communication. The super-frame can be synchronized by a synchronization frame without any limitation thereto. After the super-frame is synchronized, the D2D UEs determine a communication frame. Particularly time-frequency resources occupied by the communication frame, and a particular frame structure thereof can be determined from a pool of time-frequency resources. For example, the communication frame can be determined from the pool of time-frequency resources in a predefined manner, or configuration information of the pool of time-frequency resources can be obtained from detected synchronization information, and the communication frame can be determined according to the configuration information of the pool of time-frequency resources. The pool of time-frequency resources of D2D communication can be predefined, or can be configured semi-statically.

The TX UE detects a set of idle data channels in the data region of the current communication frame, and selects at least one data channel in the detected set of idle data channels, where the set of idle data channels includes at least one data channel.

The TX UE determines its silent period in the control region of the current communication frame, detects a control message in the silent period, and transmits a control message in anther period than the silent period, where the control message carries at least resource indication information that the selected data channel is occupied by the present TX UE.

Optionally the TX UE determines a contention region according to its priority, where the other period than the silent period lies in the contention region.

The TX UE determines whether there is resource collision over the data channel occupied by the TX UE, according to the resource indication information in the monitored control message. If there is no resource collision, then the TX UE transmits D2D data constantly over the occupied data channel until the service is terminated or release signaling is transmitted. If there is collision, then the collision will be resolved in the solution according to any one of the embodiments above.

The TX UE transmits constantly over the data channel particularly as follows:

In view of the characteristic of a VoIP service, since there are a small amount of data and a strict delay constraint thereof, in order to avoid a frequent contention procedure, the TX UE needs to transmit placeholder indication information over a specific time-frequency resource of the data channel in a silent period of VoIP to indicate that the present data channel is busy, so as to prevent other TX UEs from competing for resources of the data channel occupied by the TX UE currently in the silent period of the service.

If the D2D service is terminated or the quality of the channel is degraded, the TX UE needs to release the current data channel, then the transmitting UE transmits resource release indication information over a specific time-frequency resource of the data channel so that the other TX UEs can know as soon as possible that the present data channel is idle.

Figure 13:
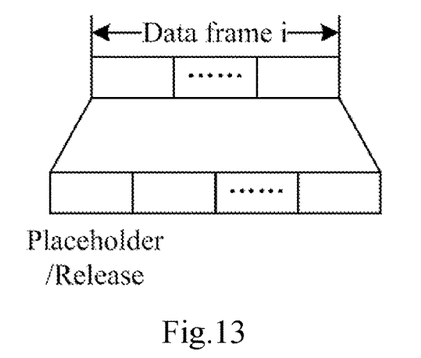
FIG. 13 is a schematic diagram of placeholder identification information according to an embodiment of the invention.

Optionally the placeholder information can occupy the same time-frequency resource as illustrated in FIG. 13.

While the data channel is being occupied, the TX UE can still transmit the control message in a control channel of the control region of each communication frame so that the suddenly accessing RX UE can receive timely the D2D data carried over the corresponding data channel, particularly in the VoIP service or the like. Alternatively the TX UE may not transmit any control message in the control region to thereby alleviate interference in the control region.

The RX UE needs to monitor all the control channels in the control region so that the RX UE determines from monitored resource indication information whether there are D2D data being transmitted in the data region. If there are D2D data being transmitted, then the RX UE will detect the D2D data over the time-frequency resources in the data region indicated by the resource indication information in the monitored control channel according to the resource indication information. Furthermore in the broadcast scenario, if there are a number of TX UEs transmitting broadcast information at the same time, then the RX UE receives control messages transmitted by the TX UEs in the control region, so the RX UE detects data transmitted by the TX UEs in the data region.

Figure 14:
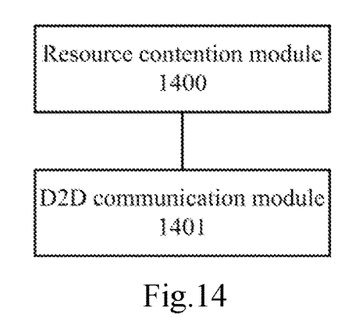

Based upon the same inventive idea as the method, an embodiment of the invention further provides a transmitting UE as illustrated in FIG. 14, which includes:

A resource contention module 1400 is configured to transmit a control message in a control region of a current communication frame, and to monitor control messages, including at least resource indication information, of other transmitting UEs in the control region of the current communication frame, where the control message include at least resource indication information, the resource indication information indicating a data channel occupied by the transmitting UE in a data region of the current communication frame: and A D2D communication module 1401 is configured to transmit D2D data over the data channel occupied by the transmitting according to the detected resource indication information.

With the technical solution according to the embodiment of the invention, the communication frame of D2D communication includes the control region and the data region, where the data region further includes a number of data channels. Different transmitting UEs can monitor control messages of each other in the control region to thereby avoid resource collision arising from competition.

Preferably before the control message is transmitted in the control region of the current communication frame, the resource contention module 1400 is further configured:

To detect a set of idle data channels in the data region of the current communication frame, and to select the data channel in the detected set of idle data channels, where the control message transmitted by the resource contention module 1400 includes at least the resource indication information that selected data channel is occupied.

Preferably the resource contention module 1400 configured to detect the set of idle data channels in the data region of the current communication frame is configured:

To determine the set of idle data channels in the data region of the current communication frame by detecting energy; and/or To determine the set of idle data channels in the data region of the current communication frame according to the resource indication information transmitted by the other transmitting UEs.

Preferably the D2D communication module 1401 is configured:

To determine that there is no resource collision over the data channel occupied by the transmitting UE, according to the monitored resource indication information, and to transmit the D2D data over the data channel.

Preferably if it is determined that there is resource collision over the data channel occupied by the transmitting UE, according to the monitored resource indication information, then the D2D communication module 1401 is further configured:

To select the data channel in the detected set of idle data channels, and to transmit in a control region of a next communication frame a control message including resource indication information that the currently selected data channel is occupied; or To determine randomly the number N of communication frames to be fallback, and to transmit the control message in a control region of the (N+1)-th communication frame following the current communication frame.

Further to any one of the embodiments above of the transmitting UE, preferably the resource contention module 1400 configured to transmit the control message in the control region of the current communication frame is configured:

To transmit the control message over a control channel, corresponding to the data channel occupied by the transmitting UE, in the control region of the current communication frame; or To transmit the control message over a randomly selected control channel in the control region of the current communication frame.

Further to any one of the embodiments above of the transmitting UE, preferably the resource contention module is configured:

To determine its silent period in the control region of the current communication frame, to transmit the control message in non-silent period in the control region of the current communication frame, and to monitor the control messages of the other transmitting UEs in the silent period in the control region of the current communication frame.

Further to any one of the embodiments above of the transmitting UE, preferably the resource contention module 1400 configured to transmit the control message in the control region of the current communication frame is configured:

To determine a contention region in the control region of the current communication frame according to its own priority, and to transmit the control message in the contention region, where the transmitting UE with a higher priority has a larger contention region.

Further to any one of the embodiments above of the transmitting UE, preferably the control message further includes priority information of the transmitting UE, and the D2D communication module 1401 is configured:

If the transmitting UE determines that there is resource collision over the data channel occupied by the transmitting UE, according to the monitored resource indication information, to compare monitored priority information with its own priority information, and if its own priority information is higher than the monitored priority information, to transmit the D2D data over the data channel.

Further to any one of the embodiments above of the transmitting UE, preferably the D2D communication module 1401 is configured to transmit the D2D data over the data channel occupied by the transmitting UE until the D2D service is terminated or the transmitting UE transmits resource release instruction information.

Preferably before the D2D service is terminated, the D2D communication module 1401 is further configured:

To transmit placeholder indication information over the data channel occupied by the transmitting UE in a silent period of the D2D service.

Further to any one of the embodiments above of the transmitting UE, preferably the communication frame is determined by the transmitting UE from a pool of time-frequency resources of D2D communication after a superframe is synchronized.

Further to any one of the embodiments above of the transmitting UE, preferably the communication frame is determined by:

Determining the communication frame from the pool of time-frequency resources of D2D communication in a predefined manner; or Obtaining configuration information of the pool of time-frequency resources from detected synchronization information, and determining the communication frame according to the configuration information of the pool of time-frequency resources.

Further to the same inventive idea as the method, an embodiment of the invention further provides a D2D UE including a processor and a radio frequency unit, where:

The processor is configured to transmit a control message in a control region of a current communication frame through the radio frequency unit, and to monitor control messages, including at least resource indication information, of other transmitting UEs in the control region of the current communication frame through the radio frequency unit, where the control message includes at least resource indication information indicating a data channel, occupied by the transmitting UE in a data region of the current communication frame; and to transmit D2D data over the data channel occupied by the D2D UE through the radio frequency unit according to the monitored resource indication information.

With the technical solution according to the embodiment of the invention, the communication frame of D2D communication includes the control region and the data region, where the data region further includes a number of data channels. Different D2D UEs can monitor control messages of each other in the control region to thereby avoid resource collision arising from contention.

Figure 15:
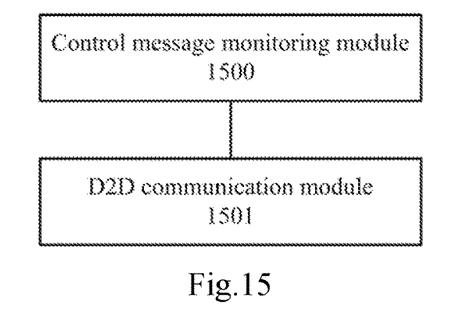
FIG. 15 is a schematic diagram of a transmitting UE according to an embodiment of the invention.

Further to the same inventive idea as the method, an embodiment of the invention further provides a receiving UE as illustrated in FIG. 15, which includes:

A control message monitoring module 1500 is configured to monitor a control message of a transmitting UE in a control region of a current communication frame, where the control message carries at least resource indication information indicating a data channel, occupied by the transmitting UE, in a data region of the current communication frame; and A D2D communication module 1501 is configured to receive D2D data in the data region of the current communication frame according to the monitored resource indication information.

With the technical solution according to the embodiment of the invention, the communication frame of D2D communication includes the control region and the data region, where the data region further includes a number of data channels. Different transmitting UEs can monitor control messages of each other in the control region to thereby avoid resource collision arising from contention.

Preferably the communication frame is determined by the receiving UE from a pool of time-frequency resources of D2D communication after a super-frame is synchronized.

Preferably the communication frame is determined by:

Determining the communication frame from the pool of time-frequency resources of D2D communication in a predefined manner; or Obtaining configuration information of the pool of time-frequency resources of D2D communication from detected synchronization information, and determining the communication frame according to the configuration information of the pool of time-frequency resources of D2D communication.

Further to the same inventive idea as the method, an embodiment of the invention further provides a receiving UE including a processor and a radio frequency unit, where:

The processor is configured to monitor a control message of a transmitting UE in a control region of a current communication frame through the radio frequency unit, where the control message carries at least resource indication information indicating a data channel, occupied by the transmitting UE, in a data region of the current communication frame: and to receive D2D data in the data region of the current communication frame through the radio frequency unit according to the monitored resource indication information.

With the technical solution according to the embodiment of the invention, the communication frame of D2D communication includes the control region and the data region, where the data region further includes a number of data channels. Different transmitting UEs can monitor control messages of each other in the control region to thereby avoid resource collision arising from competition.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claim is:

1. A Device to Device (D2D) communication method, comprising:
   transmitting, by a transmitting User Equipment (UE), a control message in a control region of a current communication frame, and monitoring control messages of other transmitting UEs in the control region of the current communication frame, wherein a communication frame comprises the control region and a data region, the control region comprises a quantity of control channels, and the data region comprises a quantity of data channels, the quantity of control channels are used to transmit control messages respectively by different transmitting UEs; wherein the control message comprises at least resource indication information indicating the data channel, used by the transmitting UE, in the data region of the current communication frame.

2. The method according to claim 1, wherein before the control message is transmitted in the control region of the current communication frame, the method further comprises:
   detecting, by the transmitting UE, a set of idle data channels in the data region of the current communication frame, and selecting the data channel in the detected set of idle data channels, wherein the control message transmitted by the transmitting UE comprises at least the resource indication information indicating that the selected data channel is used.

3. The method according to claim 2, wherein detecting, by the transmitting UE, the set of idle data channels in the data region of the current communication frame comprises:
  determining, by the transmitting UE, the set of idle data channels in the data region of the current communication frame by detecting energy; and/or
  determining, by the transmitting UE, the set of idle data channels in the data region of the current communication frame according to the resource indication information transmitted by the other transmitting UEs.

4. The method according to claim 1, wherein the method further comprises:
  transmitting, by the transmitting UE, D2D data over the data channel used by the transmitting UE according to the monitored resource indication information.

5. The method according to claim 4, wherein transmitting, by the transmitting UE, the D2D data over the data channel used by the transmitting UE according to the monitored resource indication information comprises:
  determining, by the transmitting UE, that there is no resource collision over the data channel used by the transmitting UE, according to the monitored resource indication information, and transmitting the D2D data over the data channel.

6. The method according to claim 5, wherein if the transmitting UE determines that there is resource collision over the data channel used by the transmitting UE, according to the detected resource indication information, then the method further comprises:
  selecting, by the transmitting UE, the data channel in the detected set of idle data channels, and transmitting in a control region of a next communication frame a control message comprising resource indication information that the selected data channel is used; or
  determining, by the transmitting UE, randomly the number N of communication frames to be fallback, and transmitting the control message in a control region of the (N+1)-th communication frame following the current communication frame.

7. The method according to claim 1, wherein transmitting, by the transmitting UE, the control message in the control region of the current communication frame comprises:
  transmitting, by the transmitting UE, the control message over a control channel, corresponding to the data channel used by the transmitting UE, in the control region of the current communication frame; or
  transmitting, by the transmitting UE, the control message over a randomly selected control channel in the control region of the current communication frame.

8. The method according to claim 1, wherein transmitting, by the transmitting UE, the control message in the control region of the current communication frame, and monitoring the control messages of other transmitting UEs in the control region of the current communication frame comprises:
  determining, by the transmitting UE, its silent period in the control region of the current communication frame, transmitting the control message in non-silent period in the control region of the current communication frame, and monitoring the control messages of the other transmitting UEs in the silent period in the control region of the current communication frame.

9. The method according claim 1, wherein transmitting, by the transmitting UE, the control message in the control region of the current communication frame comprises:
  determining, by the transmitting UE, a contention region in the control region of the current communication frame according to its own priority, and transmitting the control message in the contention region, wherein the transmitting UE with a higher priority has a larger contention region.

10. The method according to claim 4, wherein the control message further comprises priority information of the transmitting UE, and transmitting, by the transmitting UE, the D2D data over the data channel used by the transmitting UE according to the monitored resource indication information comprises:
  if the transmitting UE determines that there is resource collision over the data channel used by the transmitting UE, according to the monitored resource indication information, then comparing a monitored priority with its own priority, and if its own priority is higher than the monitored priority, then transmitting the D2D data over the data channel.

11. A Device to Device (D2D) communication method, wherein:
  monitoring, by a receiving User Equipment (UE), a control message of a transmitting UE in a control region of a current communication frame, wherein a communication frame comprises the control region and a data region, the control region comprises a quantity of control channels, and the data region comprises a quantity of data channels, the quantity of control channels are used to transmit control messages respectively by different transmitting UEs; wherein the control message carries at least resource indication information indicating the data channel, used by the transmitting UE, in the data region of the current communication frame; and
  receiving, by the receiving UE, D2D data in the data region of the current communication frame according to the monitored resource indication information.

12. A transmitting User Equipment (UE), comprising:
  at least one processor;
  a memory connected with the at least one processor for storing instructions executed by the at least one processor, wherein the execution of the instructions by the at least one processor causes the at least one processor to perform:
  transmitting a control message in a control region of a current communication frame, and monitoring control messages, comprising at least resource indication information, of other transmitting UEs in the control region of the current communication frame, wherein a communication frame comprises the control region and a data region, the control region comprises a quantity of control channels, and the data region comprises a quantity of data channels, the quantity of control channels are used to transmit control messages respectively by different transmitting UEs; wherein the control message comprises at least resource indication information, the resource indication information indicating the data channel used by the transmitting UE in the data region of the current communication frame; and
  a D2D communication module configured to transmit D2D data over the data channel used by the transmitting UE according to the monitored resource indication information.

13. The UE according to claim 12, wherein before the control message is transmitted in the control region of the current communication frame, the execution of the instructions by the at least one processor causes the at least one processor to further perform:
  detecting a set of idle data channels in the data region of the current communication frame, and selecting the data channel in the detected set of idle data channels, wherein the control message transmitted by the resource contention module comprises at least the resource indication information indicating that the selected data channel is used.

14. The UE according to claim 13, wherein the execution of the instructions by the at least one processor causes the at least one processor to detect the set of idle data channels in the data region of the current communication frame by:
  determining the set of idle data channels in the data region of the current communication frame by detecting energy; and/or
  determining the set of idle data channels in the data region of the current communication frame according to the resource indication information transmitted by the other transmitting UEs.

15. The UE according to claim 13, wherein the execution of the instructions by the at least one processor causes the at least one processor to further perform:
  determining that there is no resource collision over the data channel used by the transmitting UE, according to the monitored resource indication information, and transmitting the D2D data over the data channel.

16. The UE according to claim 15, wherein if it is determined that there is resource collision over the data channel used by the transmitting UE, according to the monitored resource indication information, then the execution of the instructions by the at least one processor causes the at least one processor to further perform:
  selecting the data channel in the detected set of idle data channels, and transmitting in a control region of a next communication frame a control message comprising resource indication information that the currently selected data channel is used; or
  determining randomly the number N of communication frames to be fallback, and transmitting the control message in a control region of the (N+1)-th communication frame following the current communication frame.

17. The UE according to claim 12, wherein the execution of the instructions by the at least one processor causes the at least one processor to transmit the control message in the control region of the current communication frame by:
  transmitting the control message over a control channel, corresponding to the data channel used by the transmitting UE, in the control region of the current communication frame; or
  transmitting the control message over a randomly selected control channel in the control region of the current communication frame.

18. The UE according to claim 12, wherein the execution of the instructions by the at least one processor causes the at least one processor to further perform:
  determining its silent period in the control region of the current communication frame, transmitting the control message in non-silent period in the control region of the current communication frame, and monitoring the control messages of the other transmitting UEs in the silent period in the control region of the current communication frame.

19. The UE according to claim 12, wherein the execution of the instructions by the at least one processor causes the at least one processor to transmit the control message in the control region of the current communication frame by:
  determining a contention region in the control region of the current communication frame according to its own priority, and transmitting the control message in the contention region, wherein the transmitting UE with a higher priority has a larger contention region.

20. The UE according to claim 12, wherein the control message further comprises priority information of the transmitting UE, and the execution of the instructions by the at least one processor causes the at least one processor to further perform:
  if the transmitting UE determines that there is resource collision over the data channel used by the transmitting UE, according to the monitored resource indication information, comparing a monitored priority with its own priority, and if its own priority is higher than the monitored priority, transmitting the D2D data over the data channel.

* * * * *